United States Patent [19]

Noll et al.

[11] 3,858,363
[45] Jan. 7, 1975

[54] EDGE BEVELING APPARATUS

[75] Inventors: Burton A. Noll, Painted Post; Jorge L. Torrico, Lindley, both of N.Y.

[73] Assignee: Corning Glass Works, Corning, N.Y.

[22] Filed: Dec. 7, 1973

[21] Appl. No.: 422,882

[52] U.S. Cl. .............................................. 51/105 R
[51] Int. Cl. ........................ B24b 9/00, B24b 17/00
[58] Field of Search .............. 51/99, 47, 126, 105 R, 51/105 EC; 269/321 T

[56] References Cited
UNITED STATES PATENTS

| | | | |
|---|---|---|---|
| 1,816,494 | 7/1931 | Putt | 51/88 |
| 2,084,138 | 6/1937 | Attschalk | 51/105 EC |
| 2,826,872 | 3/1958 | Robbins | 51/105 R |
| 3,274,736 | 9/1966 | Brokaw | 51/105 R |
| 3,550,322 | 12/1970 | Rajnik et al | 51/105 R |

*Primary Examiner*—Othell M. Simpson
*Attorney, Agent, or Firm*—Charles W. Gregg; Clarence R. Patty, Jr.

[57] ABSTRACT

Apparatus for beveling the annular edges or rims of the open ends of vessels such as the sealing edges of rectangular or generally elliptical television picture tube viewing panels or funnel members or the like. A plurality of rollers for rotatably supporting each vessel, a rotatable vacuum chuck for transfer of each respective vessel to and from the support rollers and imparting rotation thereto, at least one grinding wheel for contacting and beveling the annular edges of vessels supported and rotated on the rollers, and means for maintaining the rate of beveling constant regardless of the continuously varying linear location of the grinding wheel along the annular edge of each respective vessel during rotation and beveling thereof.

13 Claims, 11 Drawing Figures

Fig. 1

Patented Jan. 7, 1975  3,858,363

EDGE BEVELING APPARATUS

BACKGROUND OF THE INVENTION

There is disclosed, for example, in copending patent application, Ser. No. 412,665 filed Nov. 5, 1973 by Burton A. Noll and assigned to the same assignee as the present application, an apparatus for flat grinding the annular sealing edge of the skirt portion of a rectangular or generally elliptical viewing panel or panel member for a cathode ray or television picture tube in preparation for sealing of the sealing edge of the viewing panel to the complemental sealing edge of a funnel member for the tube. Said annular sealing edge, following said flat grinding thereof, has relatively sharp borders which are susceptible to bruise checking and it is, therefore, desirable to bevel such borders to reduce the possibility of such checking to the extent possible.

One apparatus for performing beveling of the sealing edges of rectangular or generally elliptical television picture tube viewing panels or funnel members is disclosed in U.S. Pat. No. 3,550,322, issued Dec. 29, 1970 to L. S. Rajnik et al. for Edge Beveler, such patent being assigned to the same assignee as the present application. However, the edge beveler or beveling apparatus of said patent does not bevel the sealing edges of viewing panels or funnel members as precisely as desired because, for example, the apparatus did not make allowance for variations in the linear velocity of the annular sealing edges of said members during various periods in the rotation thereof for the purpose of beveling of the sealing edges of such members. In other words, if a rectangular or generally elliptic panel member or funnel member is rotated at a constant rotational speed, the linear velocity of the annular sealing edge of such panel or funnel member, as such edge passes or moves by a selected fixed point, is not uniform. For example, the linear unit distance or length of the sealing edge of a rectangular panel in the corner regions thereof is substantially greater than such distance or length along the only slightly curved sidewalls of such panel, as is believed readily apparent. Therefore, if such panel is rotated at a constant rotational speed as in said patent to Rajnik et al., the corner regions of the panel pass a grinding wheel at a greater velocity than the relatively straight sidewalls of the panel and the sealing edge in such regions is not ground or beveled for as long a period of time as such edge in the regions of said sidewalls of the panel, as is also believed obvious. The same holds true for funnel members also. It is, therefore, one object of the present invention to provide an apparatus for precisely beveling the borders of the sealing edge of rectangular or generally elliptical television picture tube viewing panels or funnel members, or the annular edge of similar vessels, to the optimum extent possible.

It is another object of the present invention to provide an edge beveling apparatus of the type mentioned and which includes means for regulating the speed of rotation of a funnel member, panel or similar vessel having a rectangular or elliptical annular edge defining the limits of the open end of the vessel and which edge is to be beveled, such speed of rotation being regulated so that the linear velocity of said edge is relatively constant.

Other objects and characteristic features of the invention will become apparent as the description proceeds.

SUMMARY OF THE INVENTION

In pursuance of the foregoing objects of the invention and said others which will become apparent hereinafter, there is provided a plurality of at least three space-apart rollers rotatably mounted on an upper surface of a generally horizontally extending support with the axes of rotation of such roller extending in a common horizontal plane with each other, said support comprising, for example, the upper surface of the bottom of a tub and said rollers intended for supporting a rectangular or generally elliptical television picture tube viewing panel or funnel member or the like with the annular sealing edge of such member contacting said rollers. A vacuum chuck is provided for transferring said member to said support rollers and imparting rotation to such member while at least one grinding wheel contacts and bevels a border or rim of the annular sealing edge of the member. Means comprising a linear mechanical-to-electrical transducer are provided for maintaining the rate of said beveling of said sealing edge constant regardless of the rotational position of said sealing edge relative to said grinding wheel, that is, regardless of the linear location of the point of contact of said grinding wheel along said sealing edge during rotation of said member and the beveling operation being performed by the grinding wheel. The grinding wheel has a peripheral configuration generally similar to that of a torus and the wheel is adjustably supported so that the angle, at which the wheel contacts the border of sealing edges of members whose such edges are to be ground, can be periodically varied to distribute the area of the grinding surface of the grinding wheel when considered desirable, necessary or expedient to do so.

BRIEF DESCRIPTION OF THE DRAWINGS

In the Drawings.

Similar reference characters refer to similar parts in each of the FIGS. of the drawings.

PREFERRED EMBODIMENT OF THE INVENTION

Referring to the drawings in detail, there is shown in FIGS. 1, 2, 3 and 9 an edge beveling apparatus 15 embodying the invention and including an open topped tub 16 and a hinged cover panel or door 17 covering part of the front of parts of the apparatus located generally below the bottom of tub 16. Tub 16 is supported on the upper ends of legs such as 18 (FIGS. 3, 4 and 5) whose lower ends rest on the upper surface of a suitable base, platform or table 20. The bottom 16a of tub 16 is a support for a plurality of spaced-apart and similar relatively long and circularly cylindrical rollers such as 19 (FIGS. 2 and 7) which are rotatably mounted on said support or bottom 16a of tub 16 by means of upwardly extending brackets such as 21 whose bottom surfaces are secured to the upper surface 16b of support 16a by bolts such as 23 (FIG. 7) each roller such as 19 being rotatably mounted between an upper yoke member such as 22 secured to the upper end or surface of a respectively associated bracket such as 21 as by bolts such as 24 and with first ends of such rollers equally spaced from a vertical axis extending generally normal to said support 16a and through the center C of a relatively large diameter hole 16c embodied in support or tub bottom 16a. The axes of rotation of the rollers such as 19 are perpendicular or normal to said vertical axis and also in a common horizontal plane with each other. Said hole 16c embodied in bottom 16a of tub 16, that is, in said support 16a is a drain hole for slurry composition or compositions used in the beveling operations of the invention but the means for providing said slurries to the apparatus are not shown in the drawings for purposes of simplification thereof and since means for provision of slurries to grinding apparatus are well known in the art. It is pointed out however that the upper surface 16b of bottom 16a of tub 16 slopes toward said hole 16c embodied in bottom or support 16a to aid in the flow of used slurry or slurries from tub 16.

Figure 1:
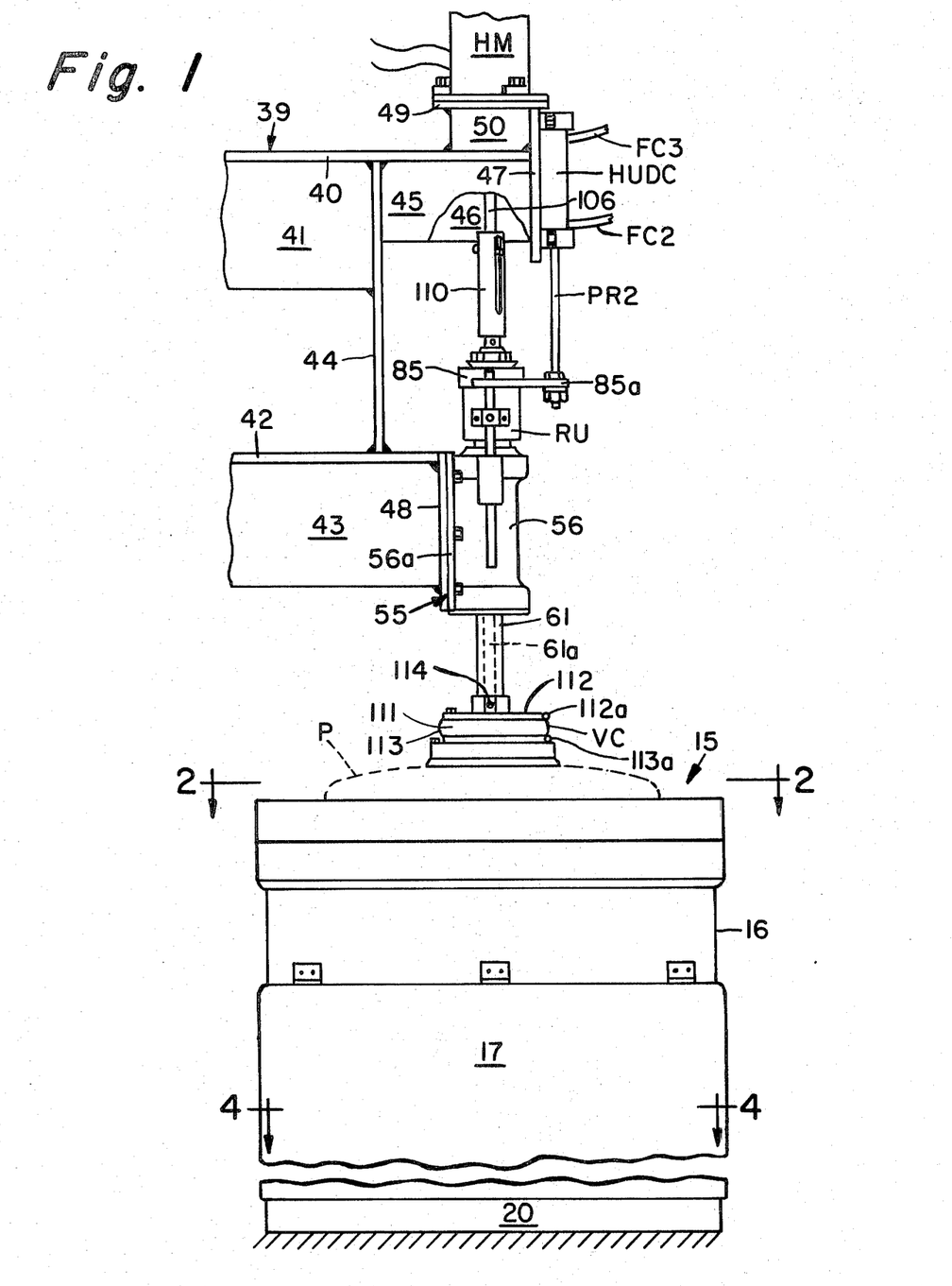
FIG. 1 is an elevational view of an edge beveling apparatus embodying the invention including a hinged cover plate for part of the apparatus.

Referring further to FIG. 1, there is shown at the upper part of such drawing figure, apparatus including a horizontally extending arm 39 comprising a rigid flat top plate 40 and a plurality of vertical and horizontal bracing and support plates 41 through 48 which are welded to each other. A gear motor HM is bolted to a plate 49 welded to the upper edge of a hollow motor support member 50 whose lower edge is welded to the upper surface of said top plate 40 of arm 39 adjacent the right hand end of such arm (viewing FIG. 1). A vacuum chuck support assembly 55 comprises a generally cylindrical longitudinal hollow housing 56 having a flange portion 56a by which such housing is secured in a vertical position to the outer face of above mentioned support plate 48 secured to and depending from the right hand ends of bracing plates 42 and 43. A rotational drive shaft 61, embodying a longitudinal vacuum passage 61a extending through the center of the greater portion of the shaft and opening out of the bottom end thereof, extends snugly but vertically slidably through suitable bearings (not shown) provided in hollow housing 56 and also through a suitable bearing (also not shown) provided in a vacuum rotary union RU. Shaft 61 extends further upwardly and into the lower end of a connecting sleeve or coupling 110 whose upper end is connected with the output shaft of the aforesaid gear motor HM by means of a connecting rod 106. By such arrangement said shaft 61 is connected in a rotatably driven relationship with said output shaft of gear motor HM. Rotary union RU provides for a supply of vacuum to passage 61a in shaft 61, such rotary unions being well known in the art.

A reciprocative motor means, comprising a pressurized fluid cylinder HUDC and associated piston rod PR2, is secured to support plate 47 fastened to the right hand end of plates 40 and 45, and the lower end of piston rod PR2 is attached to an outwardly extending portion 85a of a member 85 which, when vertically actuated up or down, actuates shaft 61 and rotary union RU in corresponding upward or downward directions. A vacuum chuck VC is connected to the lower end of drive shaft 61 and is supported by such shaft. The aforesaid vacuum passage 61a in shaft 61 at times supplies vacuum or negative pressure to vacuum chuck VC as hereinafter further mentioned in an operational example of the invention. The details of support arm 39 and its associated parts, of motor HM, of cylinder HUDC, the vacuum chuck support assembly 55 and its associated parts including drive shaft 61, and of vacuum chuck VC, form, per se, no part of the present invention but are shown merely to make the description complete. Chuck VC may, for example, be a vacuum chuck such as chuck 11 shown and described in copending application, Ser. No. 396,751 filed Sept. 13, 1973 by Burton A. Noll and assigned to the same assignee as the present application, while the remainder of the apparatus shown in the upper part of FIG. 1 and briefly described above may, for example, be apparatus such as shown in FIGS. 3, 4, 6, 7 and 8 of the aforesaid copending application, Ser. No. 412,665, filed Nov. 5, 1973 by Burton A. Noll. If more details of such apparatus or of vacuum chuck VC are desired, reference may be made to said copending applications for a detailed description thereof. However, vacuum chuck VC and said apparatus of FIG. 1 of the present application will be further briefly described hereinafter. Furthermore, correspondence between the reference characters used in the upper part of FIG. 1 of the present application and those of FIG. 3 of the last mentioned copending application will be readily apparent from a brief comparison of such drawing FIGS.

Figure 2:
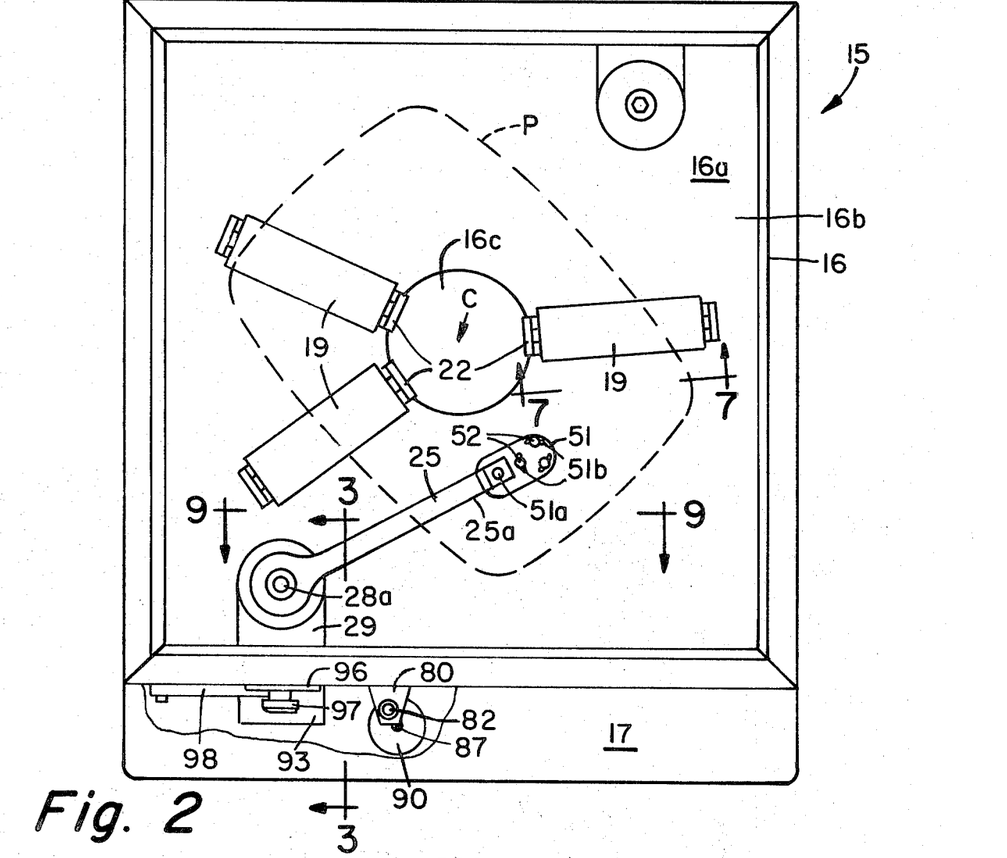
FIG. 2 is a plan view of the lower part of the apparatus of FIG. 1 including a grinding wheel support arm in a non-operating position of the wheel, such view being taken generally along line 2—2 of FIG. 1.
Figures 3, 9, 10:
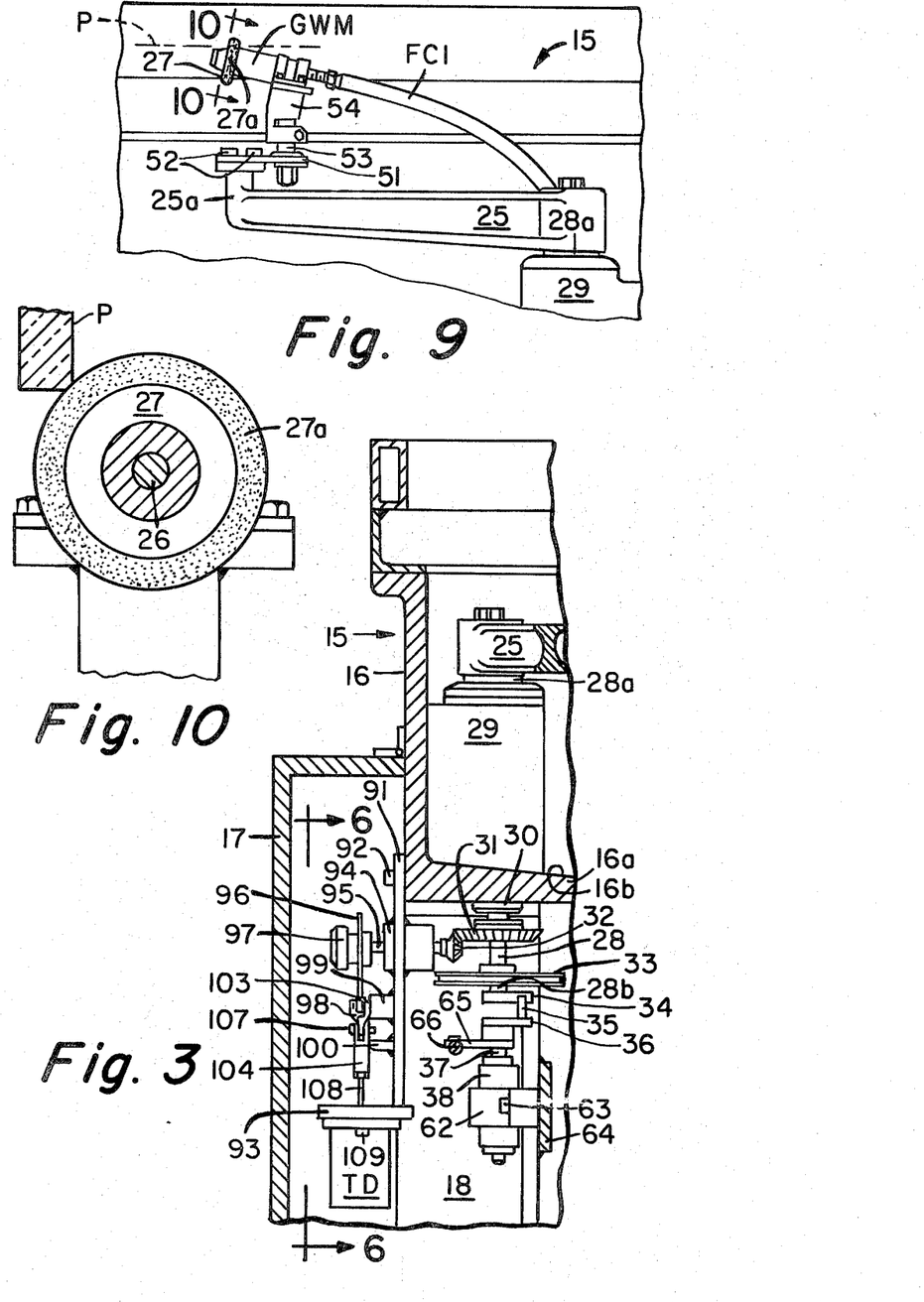
FIG. 3 is a cross-sectional elevational view of a front part of the apparatus of FIGS. 1 and 2, such view being taken generally along line 3—3 of FIG. 2.
FIG. 9 comprises a detail view taken generally along line 9—9 of FIG. 2 but with the aforesaid grinding wheel support arm in an operating position of the grinding wheel.
FIG. 10 is a detail view of the aforesaid grinding wheel in said operating position of such wheel, such view being taken generally along line 10—10 of FIG. 9.

With reference now to FIGS. 2, 3 and 9 of the present application, there is shown a generally horizontally extending support arm 25 supporting on a first end thereof (FIG. 9) a rotary motor means GWM comprising a pressurized fluid driven motor and a grinding wheel 27 secured to the output shaft 26 (FIG. 10) of said motor in a rotationally driven relationship therewith. Grinding wheel 27 includes a peripheral grinding surface 27a, such wheel and surface having a convex peripheral configuration similar to that of a torus. The second end of support arm 25 is attached to the upper end 28a of a shaft 28 which extends vertically and rotationally through a suitable bearing 30 vertically disposed in an upright boss 29 extending upwardly from the aforesaid surface 16b of support or bottom 16a of tub 16. Shaft 28, below the lower end of the aforesaid bearing 30 (FIG. 3) extends through the hub of a large diameter bevel gear 31 which is keyed in any suitable manner to shaft 28 for rotation therewith. A small diameter bevel or pinion gear 32, to be hereinafter discussed, is disposed below bevel gear 31 with the teeth of such gears meshing with each other in the usual manner. Pinion gear 32 is rotationally driven by the rotation of bevel gear 31 as hereinafter described. Shaft 28 extends further downwardly through the hub of a relatively large diameter pulley 33 (FIGS. 3, 5 and 8) which is keyed to shaft 28 in any convenient manner for reciprocative driven rotation of such shaft through selected arcs of rotation as further discussed hereinafter.

There is keyed to the extreme lower end 28b of shaft 28 for rotation therewith a short outwardly extending crank arm 34 (FIGS. 3, 4 and 5) which contacts near the end thereof an upright pin or peg 35 adjacent the upper end of such pin, the lower end of such pin being affixed to a second short outwardly extending crank arm 36 near the end of such crank arm. A relatively short axle or shaft 37 extends vertically through a suitable vertical bearing 38 supported by a pillow block 62 which is secured as by bolts such as 63 to the front surface of a crosswise support member 64 attached, as by welding, to the back of the previously mentioned front legs, such as 18, supporting tub 16. The aforesaid crank arm 36 is keyed to the upper end of shaft 37 for rotation therewith. Another relatively short crank arm 65 is also keyed to shaft 37 for rotation therewith, such crank arm being disposed on such shaft immediately below said crank arm 36. The otherwise free end of crank arm 65 is pivotally connected to a first end of a connecting rod 66 whose second end is pivotally connected to one otherwise free end of a relatively large crank arm or lever 67, such lever being pivotally supported on another relatively short shaft or axle 68 near the upper end thereof and such shaft 68 extending vertically through a suitable vertical bearing 69 supported by a pillow block 70 which is secured as by bolts such as 71 to the front surface of the aforesaid crosswise support member 64.

The second, or otherwise free end of said lever or crank arm 67 is pivotally connected to the free end of a piston rod PR1 (FIG. 4) of a reciprocative motor means comprising a horizontally disposed fluid pressure cylinder SAC and including said piston rod which extends from a first end of such cylinder. The second end of cylinder SAC is pivotally connected to a bracket 72 affixed to the back surface of said support member 64 as by being welded thereto. A pair of flexible pressurized fluid conduits FC4 and FC5 are connected with said second and first ends, respectively, of cylinder SAC. The purpose of such arrangement will be discussed hereinafter in an operational example of the invention.

Figure 4:
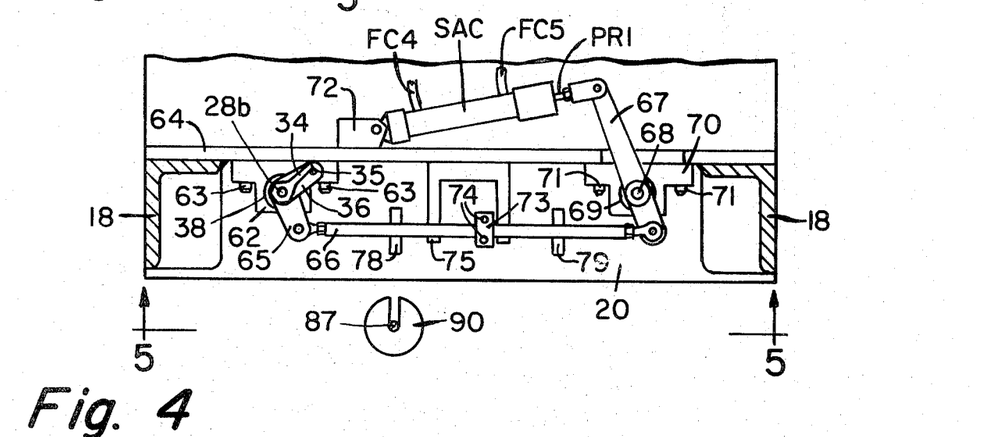
FIG. 4 is a cross-sectional plan view of a lower part of the apparatus of FIGS. 1 and 2, such view being taken generally along line 4—4 of FIG. 1 with the aforesaid hinged cover plate in a raised position.
Figure 5:
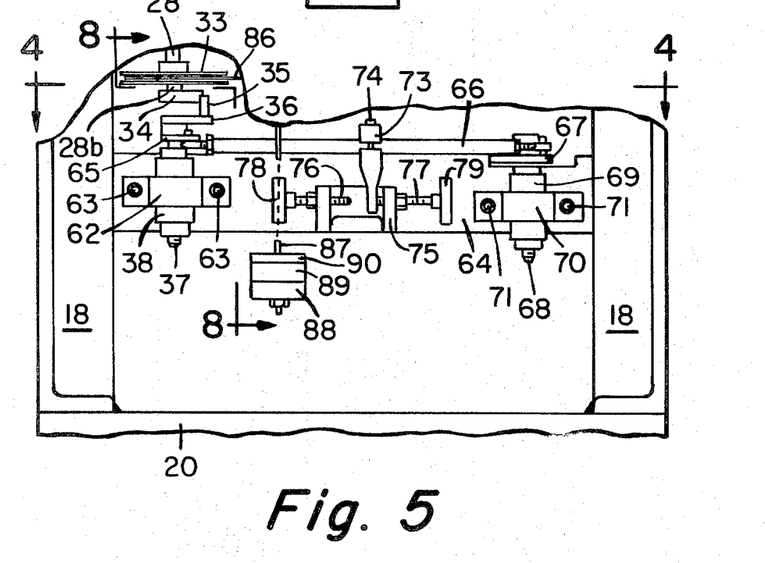
FIG. 5 comprises an elevational view taken generally along line 5—5 of FIG. 4.

Referring to FIGS. 4 and 5, there is clamped to the aforesaid connecting rod 66, near the center thereof, a downwardly depending arm 73 whose upper end is split for clamping thereof to said rod as by a pair of bolts such as 74. A "U" shaped support bracket 75 is affixed to the front surface of said support member 64 as by welding thereto and a pair of relatively short threaded rods 76 and 77 extend through suitably threaded holes provided in the horizontally extending arms of said "U" shaped support bracket 75 near the ends thereof and below the aforesaid connecting rod 66 so that the left and right hand faces (viewing FIG. 5) of the lower end of arm 73 will contact the right and left hand ends of rods 76 and 77, respectively, during movements of connecting rod 66 as hereinafter discussed. Manual adjusting knobs 78 and 79 are keyed to the left and right hand ends of threaded rods 76 and 77, respectively, for manual rotation of each respective rod and, thereby, provide for adjustingly limiting horizontal movement of arm 73 and of connecting rod 66 as further mentioned hereinafter.

Figure 8:
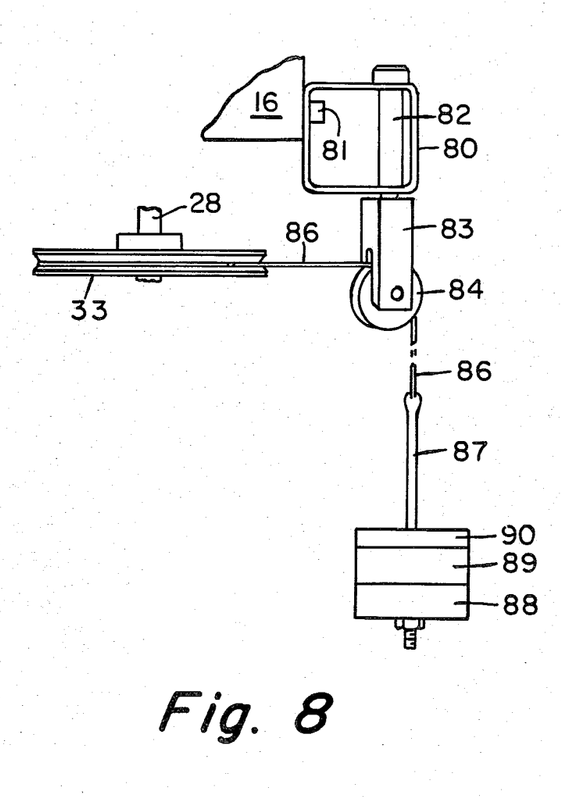
FIG. 8 is a detail view of a further part of the apparatus disclosed, such view being taken generally along line 8—8 of FIG. 5.

There is shown in FIGS. 2 and 8 a support bracket 80 which is secured, as by a bolt such as 81, to the front of tub 16 near the lower surface of such tub. Such bracket vertically supports a shoulder bolt 82 on the lower end of which is pivotally supported a clevis or forked support member 83 which rotatably supports at the lower end thereof a relatively small diameter pulley 84 (FIG. 8). A small gauge flexible wire cable 86 has one end secured to the previously mentioned pulley 33 in the groove thereof and extends around such groove of the pulley in a clockwise direction (viewing such pulley from the top thereof) and thence horizontally to said pulley 84 and around an arc of 90° of the groove of the latter pulley and vertically downward to the upper end of a counterweight support rod 87 to which the cable is securely attached. One or more slotted and varying weight counterweights such as 88, 89 and 90 can be supported by rod 87 by hanging such weights on the rod with such rod extending through the slots of the counterweights near the closed ends thereof, as is well known in the art. Such apparatus force biases support arm toward and into contact with a sealing edge to be beveled and the counterweights or combinations thereof provide for varying grinding pressure or force to be applied by the aforesaid grinding wheel 27 against the border of the sealing edge to be beveled by such wheel, as hereinafter further mentioned.

Figure 6:
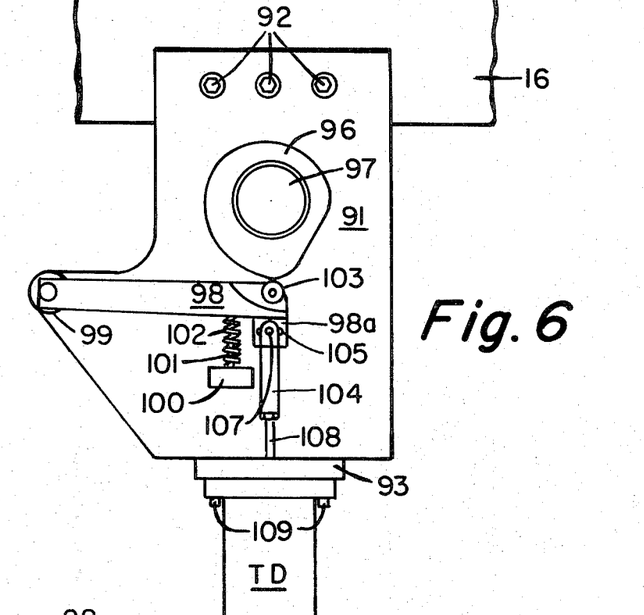
FIG. 6 comprises a detail view of part of the apparatus of the invention, such view being taken generally along line 6—6 of FIG. 3.

Referring to FIGS. 3 and 6, a vertical support plate 91 is shown attached to the front of tub 16 adjacent the bottom of such tub and by bolts such as 92, such support plate having welded to the bottom edge thereof a small horizontally extending support plate 93. (See also FIG. 2.) A bearing housing 94 (FIG. 3) extends through a suitable hole provided in plate 91 and is secured in such hole as by being welded to plate 91. A small axle 95 extends through a suitable bearing provided in housing 94 and the right hand of such axle (viewing FIG. 3) has keyed thereto the previously mentioned small diameter bevel or pinion gear 32. A cam or cam wheel 96 is keyed to axle 95 adjacent the left hand end of such axle (viewing FIG. 3) for rotation with the axle and a movably rotatable knob 97 is screwed onto said left hand end of the axle and has a hub portion contacting and bearing against cam wheel 96 to hold such cam wheel in its keyed position on axle 95. Such arrangement permits ready replacement of cam wheel 96 by manually turning knob 97 to unscrew it from the end of axle 95. Cam 96 may then be pulled from its keyed relationship with axle 95 and from the end of such axle for replacement of the cam when it is desired or considered expedient to do so.

A lever 98 has a first end (left hand end thereof viewing FIG. 6) pivotally connected to the face or a first end of a small horizontally extending boss 99 whose second end is welded to the left hand face of support plate 91 (viewing FIG. 3). A horizontally extending pin support bracket 100 is also welded to said left hand face of support plate 11 and a small upright or vertically extending pin or peg 101 is secured at its bottom end to the upper surface of such support bracket 100. The lower end of a compressible coil spring 102 surrounds pin or peg 100 and the upper end of such spring bears against the under or lower side of lever 98 to normally urge such lever in an upward direction. A cam follower 103 is pivotally mounted on lever 98 adjacent the second end thereof and the outer periphery of such cam follower is constantly urged into contact with the outer periphery of cam or cam wheel 96 by the force or pressure of spring 102. Cam follower 103 thus follows the shape of the outer periphery of cam 96 and lever 98 is actuated upwardly and downwardly accordingly, as is well known in the art.

Lever 98 has a relatively thin portion 98a extending downwardly from said second end thereof, such portion 98a embodying a generally horizontal longitudinal slot 105 extending therethrough. Such portion 98a extends downwardly between the upright arms of a clevis or forked member 104 and a pivot pin 107 extends through holes provided in said arms of clevis 104 and through said slot 105 in portion 98a of lever 98. The lower end of clevis 104 is fastened to the operating rod or plunger 108 of a mechanical-to-electrical transducer TD, such rod or plunger extending through a suitable hole embodied in support plate 93 and said transducer being secured to the bottom surface of plate 93 as by allen screws such as 109. The previously mentioned upward and downward actuation of lever 98 by cam 97 and spring 102 moves the operating rod or plunger 108 of transducer 108 further into or out of transducer 108 to variably control an electrical circuit hereinafter discussed in an operational example of the invention given in conjunction with FIG. 11 of the drawings. Transducer TD may, for example, be a voltage divider such as a potentiometer which is used to regulate a supply of electrical energy in accordance with the position of rod or plunger 108 within transducer TD, that is, in accordance with the distance said rod or plunger 108 extends or is actuated into or out of transducer TD. Mechanical-to-electrical transducers are well known in the art as are, of course, potentiometers.

Referring again to FIG. 9, taken in conjunction with FIG. 2, end 25a of support arm 25 has a horizontally and rotationally adjustable support plate 51 having a generally obround planar shape and embodying a circular hole 51a and a plurality of three arcuate slots such as 51b extending vertically therethrough and through which there extends three allen head bolts such as 52 by which plate 51 is fastened to end 25a of support arm 25. Plate 51 is horizontally rotationally adjustable by loosening said allen bolts and rotating the plate through circular arcs limited by the ends of said arcuate slots 51b as is readily apparent. A small diameter upwardly extending circularly cylindrical pedestal or axle 53 (FIG. 9) is secured in said hole 51a in plate 51 and a support 54 for previously mentioned grinding wheel motor GWM is clamped in a horizontally rotationally adjustable manner about the outer periphery of pedestal or axle 53. Motor GWM is strapped to an upper sloping surface of support 54 as illustrated in FIGS. 9 and 10. Such arrangement provides for varying the altitude or angle at which the grinding surface 27a of grinding wheel 27 contacts the border of the sealing edge of a panel such as P (FIG. 10) and permits various circumferences of said grinding surface to be used at different times for beveling purposes to distribute wear of grinding surface 27a over substantially the entire periphery of such surface.

Figure 11:
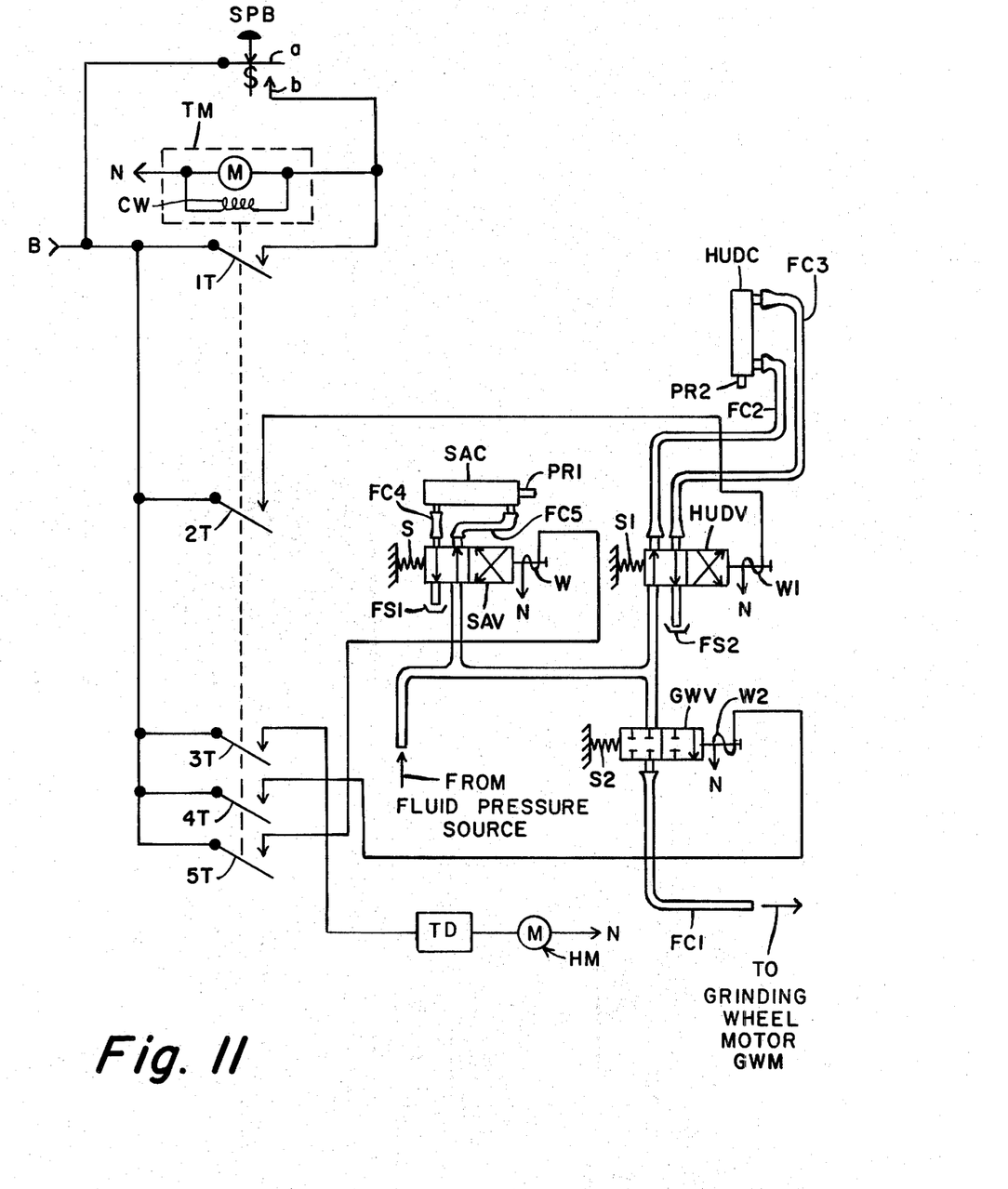
FIG. 11 comprises a schematic diagram of a pneumatic and electrical control system for the apparatus of the invention.

Referring now to FIG. 11 of the drawings, there is schematically illustrated the winding M of previously discussed gear motor HM, and previously discussed cylinders SAC and HUDC and the respectively associated piston rods PR1 and PR2 of such cylinders. Also shown conventionally in FIG. 9 are electric solenoid actuated and spring return two-position, fluid flow control valves SAV, GWV and HUDV, and a programmer or timer TM including a drive motor M, an electrically energized clutch winding CW, and a plurality of electrical circuit controlling contacts 1T through 5T which are actuated in a selected time sequence hereinafter discussed. Programmers or timers such as TM are well known in the art. A spring return manually actuated or depressed push button SPB is also shown in FIG. 11 for controlling an electrical circuit as hereinafter discussed. It will be understood that there is provided a suitable source of pressurized fluid for supply through valve GWV to grinding wheel motor GWM and through valves SAV and HUDV to cylinders SAC and HUDC, respectively. However, for purposes of simplification of the drawings said source is not shown therein. There is also provided a source of electric energy of a suitable voltage and capacity for energization of clutch CW and the winding M of timer TM, of the winding M of gear motor HM, and of the windings W, W1 and W2 of the solenoids of valves SAV, HUDV and GWV. However, also for purposes of simplification of the drawings, said source of electric energy is not shown therein but its positive and negative terminals are designated B and N, respectively.

As previously mentioned, the similarity between vacuum chuck 11 shown and described in the previously cited copending application, Ser. No. 396,751, of Burton A. Noll and the vacuum chuck VC shown in FIG. 1 of the present application will be readily apparent from a brief comparison of FIG. 1 of the present application with FIG. 2 of such copending application. However, vacuum chuck VC in the present application is shown in FIG. 1 as including an annular cover 111 of a flexible material, such as rubber for example, such cover being secured circumferentially about an upper part of chuck VC by a pair of upper and lower clamping bands 112 and 113, respectively, surrounding said cover and tightened thereabout by associated clamping screws 112a and 113a, respectively. It is further pointed out that shaft 61 and screw 114 shown in FIG. 1 of the drawings of the present application may be considered to correspond, respectively, to shaft 38 and one of the screws such as 39 of FIGS. 1 and 2 of said copending application.

Operational Example of the Invention

For purposes of an operational example of the invention, it is assumed that a television picture tube viewing panel or panel member such as P (FIGS. 1 and 2) supported by vacuum chuck VC has been transferred or delivered to the location of the beveling apparatus 15 shown in FIG. 1. Such a delivery or transfer may be performed, for example, by the transfer apparatus such as disclosed in the aforesaid copending application, Ser. No. 412,665 of Burton A. Noll. It is further assumed that arm 39 (FIG. 1) is positioned over apparatus 15 with the vertical centerline of the vacuum passage 61a in shaft 61 of chuck support assembly 55 and the center of vacuum chuck VC, as well as that of panel P, vertically aligned with the aforesaid center C of the hole 16c embodied in tub bottom or support 16a (FIG. 2). It is still further assumed that the apparatus of the present application is in an initial condition in which piston rod PR1 is retracted within grinding wheel support arm cylinder SAC (FIGS. 1 and 11) so that arm SAC is in its initial position shown in FIG. 2, that piston rod PR2 of head-up-down cylinder HUDC is retracted within such cylinder, and that the aforesaid source of pressurized fluid has been activated to supply such fluid to valves SAC and HUDV and, thereby, temporarily maintain said piston rods PR1 and PR2 in their said retracted positions within their respective cylinders.

Under the above discussed conditions, spring return push button SPB (FIG. 11) is depressed to initiate a cycle of operations of the apparatus. Such depression of the push button closes at contacts a–b thereof an electrical circuit for the energization of winding M of timer TM and of electric clutch CW of such timer, such energizaton of the motor and clutch of the timer causing contacts 1T through 5T of the timer to close in a selected sequence to actuate the apparatus in the following described manner.

Contact 1T closes to maintain winding M and clutch winding CW of the timer energized, and spring return push button SPB can then be released (no longer depressed) to permit the spring return feature of the push button to actuate contacts a–b thereof to their normally open condition.

Figure 7:
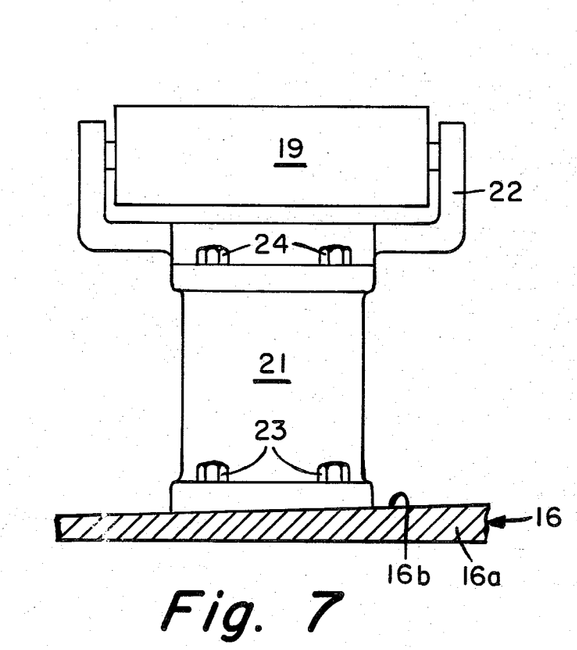
FIG. 7 is a detail view of another part of the apparatus of the invention, such view being taken generally along line 7—7 of FIG. 2.

Contact 2T closes to energize solenoid winding W1 of valve HUDV against the pressure of spring S1 and such valve is actuated to supply pressurized fluid over conduit FC3 to the upper end of cylinder HUDC while conduit FC2 is connected through said valve to a fluid sink FS2. Piston rod PR2 is, thereby, actuated downwardly to, in turn, actuate drive shaft 61 of vacuum chuck support assembly 55 (FIG. 1) downwardly, and vacuum chuck VC and panel P correspondingly downward until the sealing edge of panel P rests on the outer peripheries of the rollers such as 19 (FIGS. 2 and 7).

Contact 3T of timer TM closes and winding M (FIG. 11) of gear motor HM is energized through transducer TD to impart rotation to shaft 61 of assembly 55 (FIG. 1) and thence to vacuum chuck VC and panel P to rotate such panel on said rollers such as 19.

Contact 4T of timer TM closes and winding W2 of grinding motor valve GWV is energized to actuate such valve to supply pressurized fluid over conduit FC1 to motor GWM (FIG. 9) and, thereby, rotate grinding wheel 27.

Contact 5T of timer TM closes to energize winding W of valve SAV and, thereby, actuate such valve to supply pressurized fluid over conduit FC4 (FIGS. 4 and 11) to the left hand side of cylinder SAC (viewing FIG. 4) and actuate piston rod PR1 of such cylinder towards its extended position. At such time conduit FC5 is connected to a fluid sink FS1. The actuation of piston rod PR1 of cylinder SAC towards said extended position causes lever 67 (FIGS. 4 and 5) to rotate in a clockwise direction (viewing FIG. 4) and thereby actuate connecting rod 66 to the left to, in turn, cause clockwise rotation of crank arms 65 and 36 (FIGS. 3, 4 and 5). This operation causes pin 35 in crank arm 65 to move to permit crank arm 34 to be rotated in a clockwise direction by clockwise rotation of pulley 33 and shaft 28 (FIGS. 5 and 8) by the aforesaid biasing force of cable 86 and a selected combination of counterweights such as 88, 89 and 90. Such rotation of shaft 28 swings grinding wheel support arm 25 (FIGS. 2, 3 and 9) in a direction such that the grinding surface 27a of grinding wheel 27 contacts the inner border of the sealing edge of the panel such as P as illustrated in FIGS. 9 and 10, such sealing edge of the panel being rotated at such time on the rollers, such as 19, by motor HM.

With reference to FIG. 5, it will be noted that the above mentioned rotation of shaft 28 by said biasing force also rotates bevel gear 31 in a clockwise direction (viewing such gear from above) to impart clockwise rotation of pinion gear 32 (viewing the end of such gear) and corresponding rotation of cam 97 through a rotational arc, that is, counterclockwise arcuate rotation of such cam when viewing FIG. 6. It is pointed out that the counterweights such as 88, 89 and 90 control the amount of grinding pressure or force exerted by the grinding surface 27a of grinding wheel 27 against said inner border of the sealing edge of a panel such as P, such grinding pressure or force being variable by using different counterweights such as 88, 89 and 90 either alone or in combination with each other.

During the rotation of a panel such as P by motor HM in the course of a beveling of the inner border of the sealing edge of such a panel as discussed above, the grinding surface of grinding wheel 27 follows such border or sealing edge, such wheel being urged or forced biased against said inner border by said counterweights as discussed above. Such following of said inner border causes support arm 25 to reciprocatively swing or move towards and away from the center of tub 16 (FIG. 2) as will be readily apparent to those skilled in the art. Such reciprocative swinging movement of arm 25 causes reciprocative rotation of cam 96 (FIG. 6) as discussed above and cam follower 103 on lever 98 follows the outer periphery of such cam during such rotation. Lever 98 is moved upwardly and downwardly under the force of spring 102 and cam follower 103, respectively. Such upward and downward actuations of lever 98, in turn, causes corresponding upward and downward actuations of the control plunger or rod 108 of transducer TD as will be readily apparent from a brief reference to FIG. 6.

Cam 96 is shown in FIG. 6 in the rotative position it occupies when grinding wheel support arm 25 is swung towards the center of tub 16 (FIG. 2) during a beveling operation. That is to say, cam follower 103 (FIG. 6) bears against the high part of the periphery of cam 97 when grinding wheel 27 is beveling the inner border of the sealing edge of a panel such as P at either end of the minor axis of the panel, that is, at one or other of the ends of the smallest diameter of a panel such as P. As the panel is rotated, grinding wheel 27 moves along said inner border to an end of one of the diagonal axes of panel P, that is, to one of the ends of the largest diameter of a panel such as P. At this time cam follower 103 bears against a low part of the periphery of cam 97. When grinding wheel 27 is grinding said border at either end of the major axis of panel P, cam follower 103 bears against the outer periphery of cam 96 at a point or location on such periphery which is intermediate said low and high parts of the periphery of cam 96. Thus control plunger or rod 108 of transducer TD is actuated to a greater or lesser, or to an intermediate distance, into transducer TD depending on whether the inner border of the sealing edge of a panel such as P is being beveled at an end of the minor axis, at an end of a diagonal axis, or at an end of the major axis of the panel, respectively. When said border is being beveled at locations intermediate said ends of said axes, control plunger or rod 108 is actuated into or out of transducer TD distances selected to correspond with said intermediate locations as will now also be readily apparent to those skilled in the art.

Referring again to FIG. 11 of the drawings, transducer TD varies the electrical energization of winding M of motor HM according to the above discussed actuations of control plunger or rod 108 of transducer TD. That is to say the energization of winding M of motor HM, and, therefore, the speed of such motor, is increased and decreased, respectively, according as control plunger or rod 108 is actuated to greater and lesser distances into transducer TD. Such increase and decrease in the energization of said winding M of motor HM causes panel P to be rotated at faster and slower speeds, respectively, to make the linear speed of the sealing edge of the panel, as such edge passes grinding wheel 27, such that generally uniform beveling of the inner border of the sealing edge of the panel results.

Referring again to FIG. 11, after a period of time allowed for a cycle of beveling operations, contacts 5T, 4T, 3T, 2T and 1T of timer TM are actuated to open, preferably in such stated sequence, to sequentially return grinding wheel support arm 25 to its initial position shown in FIG. 2, terminate the supply of pressurized fluid to grinding wheel motor GWM to terminate the rotation of grinding wheel 27, interrupt the energization of winding M of motor HM to terminate the rotation of panel P, return vacuum chuck VC and, thereby, panel P to their raised positions away from the beveling apparatus, and to then deenergize clutch and motor windings CW and M of timer TM to terminate the operation of such timer. All the apparatus of the present invention is then in its initial positions or conditions in preparation for beveling the border of the sealing edge of another panel such as P delivered to the beveling apparatus, the initiation of such beveling operation being performed as previously discussed, that is, by the manual depressing of push button SPB.

Referring again to FIGS. 4 and 5 of the drawings, it will be noted that arm 73 limits the distances of movements of connecting rod 66 in accordance with manual adjustments of knobs 78 and 79 as previously mentioned. Such limiting of the movements of connecting rod 66 provides limits for the swinging movements of support arm 25 and, thereby, of grinding wheel 27. The apparatus can, therefore, be adjusted for use with different sizes of television picture tube viewing panels or funnel members within a selected range of such sizes. It is pointed out that rather than varying the speed of rotation of motor HM to obtain generally uniform beveling of borders of sealing edges of television picture tube viewing panels (or funnel members) the speed of rotation of grinding wheel 27 could be varied to accomplish the same end. This could be accomplished by means of an electrically actuated fluid flow control valve which would vary the pressure of pressurized fluid supplied to motor GWM to vary the speed of rotation of grinding wheel 27. However, in such case, the speed of rotation of the grinding wheel would be increased when the sealing edge border is being beveled at the ends of the diagonal axis of a panel and decreased when said border is being beveled at the ends of the minor axis of the panel etc.

It is also pointed out that, with minor obvious changes in the apparatus, beveling operations could be performed on the outer borders of the sealing edges of panels (or funnel members) rather than the inner borders thereof or, with a few additions to the apparatus, beveling operations could be performed simultaneously on both the inner and outer borders of the sealing edges of panel (or funnel members) or on one or the other of such borders by two sets of oppositely disposed grinding wheels and associated support arms such as 27 and 25, respectively.

As previously mentioned, the inferred or suggested, it is further pointed out that the apparatus of the present invention can be used to bevel the borders of the sealing edges of funnel members for television picture tubes although the apparatus is specifically discussed and shown as used with panel members for such tubes. If the apparatus is to be used with funnel members, a suitable support for such members is substituted for vacuum chuck VC and its associated support assembly. Such a funnel member support could, for example, be similar to plate member 64 shown in FIG. 1 of the aforesaid U.S. Pat. No. 3,550,322 but with such plate member supported by a rotatable and axially reciprocative shaft adapted to be extended downwardly through the neck or yoke portion of a funnel member and secured to the plate member 64.

Although there is herein shown and described only one form of apparatus embodying the invention, it will be understood that such is not intended to be considered in any way limiting but that various changes and modifications may be made therein within the purview of the appended claims without departing from the spirit and scope thereof.

What is claimed is:

1. Apparatus for beveling the annular sealing edge of a rectangular or generally elliptical television picture tube viewing panel member or funnel member, such apparatus comprising, in combination;

I. a plurality of at least three similar, relatively long and circularly cylindrical spaced-apart rollers rotatably mounted on an upper surface of a generally horizontally extending support with first ends of such rollers generally equally spaced from a selected vertical axis extending generally normal to said support and the axes of rotation of the rollers perpendicular to said axis and in a common horizontal plane with each other;

II. means for rotatably supporting one of said picture tube members above said rollers with the annular sealing edge thereof depending, said supporting means being actuable to vertically move said member and, thereby, said sealing edge into and out of contact with the outer peripheries of said rollers;

III. a grinding wheel and associated first rotary motor means for driven rotation of such wheel, such wheel and motor means supported on a first end of a generally horizontal support arm whose second end is pivoted for generally horizontal swinging movement of the arm in first and second opposite directions and, thereby, the grinding surface of said grinding wheel into and out of contact, respectively, with a border of the sealing edge of a picture tube member when such edge is in contact with said outer peripheries of said rollers;

IV. means for force biasing said support arm in said first direction of swinging movement;

V. first reciprocative motor means for moving said arm in said second direction of swinging movement against the force of said force biasing means and permitting movement of said arm in said first direction according as such motor means are energized in first or second modes, respectively;

VI. second rotary motor means for driven rotation of said member supporting means and a tube member supported thereby;

VII. second reciprocative motor means for vertically moving said member supporting means and a supported tube member and, thereby, said annular sealing edge of such member into and out of contact with said outer peripheries of said rollers according as such motor means are energized in first and second modes, respectively; and VIII. means, responsive to said swinging movement of said support arm, for regulating rotational speed of one of said rotary motor means to maintain a generally uniform rate of beveling of the border of said sealing edge of a tube member when such border is contacted by said surface of said grinding wheel during a beveling operation, such uniform rate being maintained regardless of the varying linear location of such grinding wheel along said border during rotation of the tube member and its sealing edge.

2. Apparatus in accordance with claim 1 and in which said second rotary motor means is a variable speed electric motor whose speed is regulated to maintain said uniform rate of beveling.

3. Apparatus in accordance with claim 1 and in which said grinding wheel has a convex peripheral configuration similar to that of a torus and said grinding surface of such wheel is the outer perimetric surface thereof.

4. Apparatus in accordance with claim 2 and in which said grinding wheel has a convex peripheral configuration similar to that of a torus and said grinding surface of such wheel is the outer perimetric surface thereof.

5. Apparatus in accordance with claim 2 and in which said means for regulating speed of said second rotary motor means is a mechanical-to-electrical transducer which regulates electrical energy supplied to such motor means in accordance with said swinging movement of said support arm.

6. Apparatus in accordance with claim 1 and further including a control means including a timer for sequentially:
A. energizing said rotary motor means;
B. energizing said second reciprocative motor means in said first mode thereof;
C. energizing said first reciprocative motor means in said second mode thereof;
D. following a period of time sufficient to bevel said border of said sealing edge of said picture tube member, energizing said first reciprocative motor means in said first mode thereof; and
E. energizing said second reciprocative motor means in said second mode thereof and deenergizing said rotary motor means.

7. Apparatus in accordance with claim 2 and further including a control means including a timer for sequentially;
A. energizing said rotary motor means;
B. energizing said second reciprocative motor means in said first mode thereof;
C. energizing said first reciprocative motor means in said second mode thereof;
D. following a period of time sufficient to bevel said border of said sealing edge of said picture tube member, energizing said first reciprocative motor means in said first mode thereof; and
E. energizing said second reciprocative motor means in said second mode thereof and deenergizing said rotary motor means.

8. Apparatus in accordance with claim 3 and further including a control means including a timer for sequentially;
A. energizing said rotary motor means;
B. energizing said second reciprocative motor means in said first mode thereof;
C. energizing said first reciprocative motor means in said second mode thereof;
D. following a period of time sufficient to bevel said border of said sealing edge of said picture tube member, energizing said first reciprocative motor means in said first mode thereof; and
E. energizing said second reciprocative motor means in said second mode thereof and deenergizing said rotary motor means.

9. Apparatus in accordance with claim 4 and further including a control means including a timer for sequentially;
A. energizing said rotary motor means;
B. energizing said second reciprocative motor means in said first mode thereof;
C. energizing said first reciprocative motor means in said second mode thereof;
D. following a period of time sufficient to bevel said border of said sealing edge of said picture tube member, energizing said first reciprocative motor means in said first mode thereof; and
E. energizing said second reciprocative motor means in said second mode thereof and deenergizing said rotary motor means.

10. Apparatus in accordance with claim 5 and further including a control means including a timer for sequentially;
A. energizing said rotary motor means;
B. energizing said second reciprocative motor means in said first mode thereof;
C. energizing said first reciprocative motor means in said second mode thereof;
D. following a period of time sufficient to bevel said border of said sealing edge of said picture tube member, energizing said first reciprocative motor means in said first mode thereof; and
E. energizing said second reciprocative motor means in said second mode thereof and deenergizing said rotary motor means.

11. Apparatus in accordance with claim 1 and in which said tube member is a picture tube viewing panel member and said member supporting means includes a vacuum chuck for contacting the face plate portion of said member for said supporting thereof.

12. Apparatus in accordance with claim 5 and in which said tube member is a picture tube viewing panel member and said member supporting means includes a vacuum chuck for contacting the face plate portion of said member for said supporting thereof.

13. Apparatus in accordance with claim 6 and in which said tube member is a picture tube viewing panel member and said member supporting means includes a vacuum chuck for contacting the face plate portion of said member for said supporting thereof.

* * * * *